United States Patent [19]

Shenouda et al.

[11] Patent Number: 4,781,935
[45] Date of Patent: Nov. 1, 1988

[54] PROCESS FOR KEEPING COOKED POULTRY SKIN UNWRINKLED DURING LOW TEMPERATURE STORAGE

[75] Inventors: Soliman Y. K. Shenouda, Tarrytown; Erna Krueger, Hawthorne, both of N.Y.; Bitte C. Andreasson, Greenwich, Conn.; Nabil A. El-Hag, Putnam Valley; Mary W. Yuan, No. Tarrytown, both of N.Y.

[73] Assignee: General Foods Corporation, White Plains, N.Y.

[21] Appl. No.: 862,071

[22] Filed: May 12, 1986

[51] Int. Cl.$^4$ ............................................. A23L 1/315
[52] U.S. Cl. .................................... 426/290; 426/296; 426/303; 426/644
[58] Field of Search ............... 426/290, 296, 302, 644, 426/523, 807, 303

[56] References Cited

U.S. PATENT DOCUMENTS

| | | | |
|---|---|---|---|
| 2,366,169 | 1/1945 | Barth | 426/296 |
| 2,641,544 | 6/1953 | Parker | 426/302 |
| 3,395,024 | 7/1968 | Earle | 426/291 |
| 3,522,058 | 7/1970 | Libby | 426/644 |
| 3,900,575 | 8/1975 | Rapoport | 426/302 |
| 4,196,219 | 4/1980 | Shaw et al. | 426/302 |
| 4,367,242 | 1/1983 | Jarvis et al. | 426/296 |
| 4,518,618 | 5/1985 | Hsia et al. | 426/296 |

FOREIGN PATENT DOCUMENTS

| | | | |
|---|---|---|---|
| 0663735 | 5/1963 | Canada | 426/644 |
| 0137052 | 8/1979 | Fed. Rep. of Germany | 426/302 |
| 0205960 | 11/1984 | Japan | 426/296 |
| 0232059 | 12/1984 | Japan | 426/302 |

*Primary Examiner*—Kenneth M. Schor
*Assistant Examiner*—V. Manoharan
*Attorney, Agent, or Firm*—Sam D. Walker; Thomas R. Savoie; Daniel J. Donovan

[57] ABSTRACT

A process for keeping cooked poultry skin unwrinkled during low temperature storage wherein glazed cooked, skin-covered meat product is cooled to about 40° F. followed by searing the skin at a high temperature then glazing once again and cooling to a refrigeration temperature for storage.

6 Claims, No Drawings

PROCESS FOR KEEPING COOKED POULTRY SKIN UNWRINKLED DURING LOW TEMPERATURE STORAGE

FIELD OF INVENTION

The present invention is concerned with a process to prevent wrinkling of poultry skin. More particularly, the present invention is concerned with a series of basting, heating and cooling steps which prevents wrinkling of poultry skin during low temperature storage.

BACKGROUND

A skin-covered meat product such as poultry and particularly chicken when subjected to heat at a certain intensity, causes the moisture present in the meat beneath the skin to vaporize. These vapors create pockets between the meat and the skin and act as an insulator for the meat. This results in the meat beneath the skin being subjected to only moderate heating, hence, insufficiently cooked and slight to moderate moisture loss. The skin, on the other hand, being in direct contact with the heat, loses moisture more rapidly and if not controlled eventually shrinks and burns. When stored at refrigeration temperature, the uneven moisture loss causes excessive shrinking and wrinkling of the skin accompanied by discoloration to a grayish purple color resulting in the finished product having an unacceptable appearance.

It is, therefore, an object of the present invention to produce a cooked, skin-covered meat product with acceptable appearance.

Another object of the present invention is a process for producing a skin-on poultry product with an acceptable appearance.

A further object of the present invention is a process for producing a skin-on poultry product with an unacceptable appearance after refrigerated storage at temperature of from 32° F. to 40° F. for up to 21 days.

SUMMARY OF THE INVENTION

The present invention is concerned with the problems associated with skin-covered meat products which tend to have an unacceptable appearance due to shrinkage of the skin and also the formation of excessive wrinkles on the skin surface. The present invention teaches a process for remedying the above problems. In this process, a skin-covered meat product is first basted with a glaze and placed in a preheated oven until it is completely cooked. The cooked, skin-covered product is then cooled for a first time to a temperature ranging from 40° to 100° F. followed by exposing same to temperature ranging from 500° to 800° F. to sear and permanently stretch the skin. The seared permanently stretched, skincovered product is basted with a glaze once again and cooled for a second time to a temperature ranging from 32° F. to 40° F. for storage.

DETAILED DESCRIPTION

The process of the present invention involves a series of steps which produce a vast improvement in the appearance and acceptability of refrigerated cooked, skin-covered meat products such as poultry. This is accomplished by a series of heating and cooling steps.

It should be understood that the starting material and process of the present invention should not be limited to poultry but could be applicable to pre-cooked frozen food products such as chicken, turkey, duck, rabbit and like skin-covered meat products. The preferred starting materials, however, are poultry products such as chicken and Cornish hen.

The first step of the present invention is a basting or a glazing step wherein the skin covered product is coated with a glaze. The type of coating used is largely a matter of taste but should be limited, however, to fruit jelly, wine and sugar and spice coatings. The entire exposed surface of the meat should be glazed, and particular attention should be given to the skin-covered portion.

The glazed, skin-covered meat is then placed in a preheated oven and baked until cooked. The time required to completely bake the product generally ranges from 20 minutes to 40 minutes and preferably from 25 minutes to 35 minutes. Generally the temperature of the oven should be within the range of about 300° F. to about 400° F. and preferably between 325° F. to about 375° F. This baking may be accomplished by any conventionally known baking means, such as oven or microwave device. However, baking is preferably accomplished in a continuous, gas-fired oven.

The purpose of this baking step is to completely cook the meat portion to an interval temperature reaching 165° F.

The completely cooked, baked skin-covered meat product is then cooled for a first time to temperatures ranging from 40° F. to 100° F. Cooling may be accomplished by any known method such as placing into a refrigerator for a time sufficient to cool the skin-covered chicken to the desired temperature. Cooling is preferably accomplished by subjecting the skin-covered chicken in a continuous manner to a stream of cool air having temperatures ranging from 25° F. to 40° F., traveling at a velocity of 5 to 20 feet per second for a time sufficient to reach the desired refrigeration temperature.

Cooling the skin covered product prevents overcooking which, if occurs, causes the resulting product to have a dry, tough texture.

The cooled skin-covered meat product is then exposed to searing temperatures in the range of 500° F. to 600° F. and preferably about 500° F., for a time sufficient to sear the skin of the meat product. Care must be taken to prevent burning of the skin. For instance, if hot air is utilized, the temperature needed to sear the skin of the meat would generally be about 500° F., and the time of exposure would be greater. However, when the skin is exposed to a flame, the flame temperature is usually about 1000° F., and the time required would be significantly shorter since exposure to an open flame for long periods of time would burn rather than sear the skin.

The purpose of the searing i.e. high temperature short time exposure, is to irreversibly stretch the skin. This results from a molecular denaturation of the collagen fiber of the skin at a rate effective to preventing shrinking at the skin re-cooling and/or cold storage at refrigerated temperatures.

The seared skin, covered-meat product is then basted with a glaze and cooled to refrigeration temperature for storage. The glaze may be of the type disclosed above but is generally a matter of choice. The purpose of this second glazing step is mostly decorative but also adds moisture to the seared skin. After the glaze is applied, the skin-covered meat product is cooled to a temperature ranging from 32° F. to 37° F. for long term storage.

It is important that the steps of the present invention be followed in the sequential fashion disclosed. Any variation can affect the quality of the final product. For instance, the present invention teaches two heating steps interrupted by a cooling step. The first heating is a cooking step while the second heating step is to permanently stretch the skin, thereby creating the desired results. The cooking has to occur prior to the stretching of the skin.

EXAMPLE I

Skin covered portions of Cornish hens were glazed, placed in an oven and cooked until their internal temperature reached 165° F. The cooked pieces were then cooled to an internal temperature of 60° F. by placing them in a refrigerator. The cooled pieces were exposed to hot air having a temperature of 600° F. for 30 seconds to sear the skin.

The seared pieces were once again basted with a glaze, then cooled to 35° F. for storage.

The finished product had vast improvement in appearance when stored under refrigerated conditions.

What is claimed is:

1. A process for keeping the skin of a cooked, skin-covered meat product unwrinkled during low temperature storage comprising the steps:
   (a) basting the skin-covered meat product with a glaze;
   (b) placing the glazed, skin-covered meat product into a preheated oven until cooked;
   (c) cooling the cooked, skin-covered meat product for a first time to a temperature ranging from 40° to 100° F.;
   (d) exposing the cooled, skin-covered meat product to temperatures ranging from 400° F. to 600° F. to sear and stretch the skin;
   (e) basting the stretched, seared skincovered meat product with a glaze; and
   (f) cooling the twice-glazed, skin-covered meat product for a second time to a temperature ranging from 32° F. to 40° F. for storage.

2. A process according to claim 1 wherein the skin-covered meat product is a poultry product.

3. A process according to claim 2 wherein the poultry product is Cornish hen.

4. A process according to claim 1 wherein said step (a) and/or step (e) glaze is a member selected from a group consisting of jelly, wine, sugar and spices.

5. A process according to claim 1 wherein the oven is preheated to a temperature ranging from 325° F. to 375° F.

6. A process according to claim 1 wherein the cooked, skin-covered meat product is cooled for said first time by subjecting to a stream of cool air having temperatures ranging from 25° F. to 35° F.

* * * * *